United States Patent [19]

Wilwerding

[11] Patent Number: 4,812,640
[45] Date of Patent: Mar. 14, 1989

[54] SLIT LENS AUTOFOCUS SYSTEM

[75] Inventor: Dennis J. Wilwerding, Littleton, Colo.

[73] Assignee: Honeywell Inc., Minneapolis, Minn.

[21] Appl. No.: 54,986

[22] Filed: May 28, 1987

[51] Int. Cl.⁴ .............................................. G01J 1/36
[52] U.S. Cl. .................................... 250/204; 250/201; 354/408
[58] Field of Search ........................ 250/201 PF, 204; 354/402, 404, 408

[56] References Cited

U.S. PATENT DOCUMENTS 3,682,071 8/1972 Hosoe .................................. 354/404
4,185,191 1/1980 Stauffer .
4,309,603 1/1982 Stauffer .
4,481,413 11/1984 Wilwerding .

Primary Examiner—Edward P. Westin
Assistant Examiner—Khaled Shami
Attorney, Agent, or Firm—Charles J. Ungemac

[57] ABSTRACT

An autofocus system employing a slave lens which is so shaped or configured as to produce a strip of radiation on a pair of detectors used in the autofocus system thus enabling an attractive and useful arrangement for photographic or video camera apparatus.

9 Claims, 1 Drawing Sheet

SLIT LENS AUTOFOCUS SYSTEM

BACKGROUND OF THE INVENTION

In my U.S. Pat. No. 4,481,413, I describe and claim an improvement for autofocus devices used in, for example, video cameras, wherein I provide a totally reflecting strip mirror, rather than a larger partially reflecting mirror used in the prior art, to divert a portion of the radiation from the camera taking lens to the autofocus circuitry for use in determining the correct position of the taking lens. The strip mirror produces a band of radiation which falls across a portion of the radiation detectors that are used in the autofocus system.

In the Norman L. Stauffer U.S. Pat No. 4,309,603, issued Jan. 5, 1982, and assigned to the assignee of the present invention, a system is shown wherein an auxiliary lens is mechanically connected to the camera taking lens and means are provided to move both the taking lens and the auxiliary lens simultaneously. The auxiliary lens is used to provide a path for radiation to the autofocus detectors rather than using any mirror to redirect a portion of the radiation from the taking lens thereto.

The use of an auxiliary lens for autofocus has the advantage that all of the light going through the taking lens reaches the video electronics or film rather than diverting part of it to the autofocus circuitry. The use of the strip mirror also has certain advantages since (1) the detectors no longer have to be shaped in any particular configuration and are thus more easily manufactured (2) the percentage of the surface of the detectors covered by radiation is greater and there is less wasted light and (3) the adjustment of the optics so as to cause the radiation to fall on the detectors is more easily accomplished. One disadvantage of the slave lens system is that the additional lens configuration on the face of the camera is often unsightly. A disadvantage of the strip mirror is that some light is lost on reflection and the mirror physically takes up space in the camera which is often quite limited by the optical and electronic packages.

SUMMARY OF THE INVENTION

The present invention overcomes the problems in the prior art by providing, instead of a strip mirror, an auxiliary lens which is formed in a slit configuration (or alternately a regular lens having a mask thereover to form a slit aperture for the lens). Thus a band of radiation for the detectors is provided without using a strip mirror and the shaped lens or slit mask can be placed on the exterior surface of the camera face in a variety of attractive arrangements not possible with a circular lens. A more complete understanding of the present invention will result from an examination of the following specification and claims taken in connection with the attached drawings.

DETAILED DESCRIPTION OF THE PREFERRED EMBODIMENTS

Figure 1:
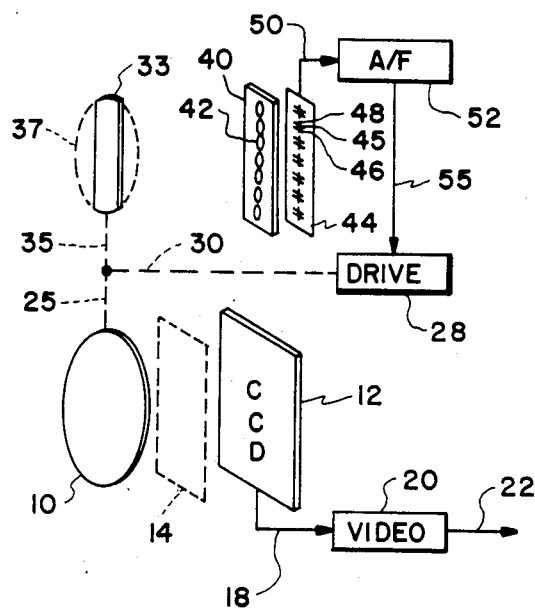
FIG. 1 is a perspective and diagramatic view of the present invention.
Figure 2:
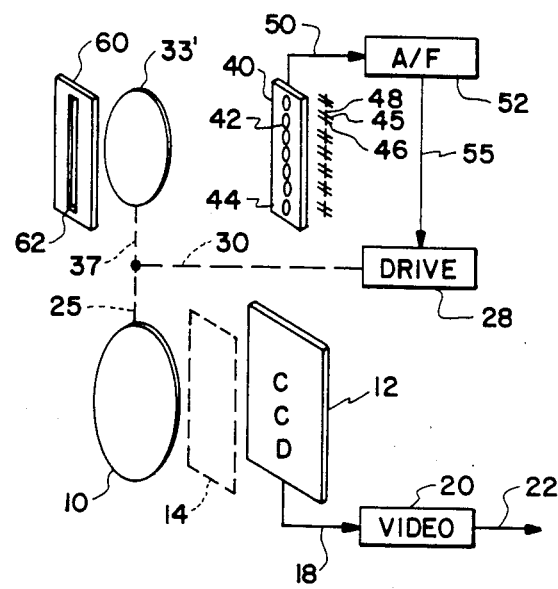
FIG. 2 is a perspective and diagramatic view of an alternate embodiment of the present invention.

In FIGS. 1 and 2, the diagrams show a slave lens system similar to that described and claimed in the above-referred to U.S. Pat. No. 4,309,603. In FIG. 1, the taking lens 10 of a photographic or video camera is shown which receives light from a remote object (not shown) to form an image thereof on a CCD detector array 12 of a video camera. It should be understood that in lieu of a CCD detector array as used in a video camera, the film of a photographic camera may be placed in the same position in which event a shutter which is shown in phantom by dash line 14 in FIG. 1 would be employed so that after the taking lens 10 was moved to the proper focus position, the shutter would be opened or moved out of the way to thus expose the film.

The CCD detector array 12 produces an output shown by arrow 18 to the video electronics 20 which processes the signals to produce an output shown by arrow 22 for storage on a magnetic tape or for use by the CRT of a video monitor.

The taking lens 10 is shown in FIG. 1 coupled by a mechanical connection shown as dash line 25 to a drive 28 by means of a second mechanical connection shown as dash line 30. Drive 28 will, as explained hereinafter, operate to position lens 10 at the proper focus position so that the image received by the CCD array 12 (or the film of a camera) will be in proper focus.

An auxiliary or slave lens 33 is shown in FIG. 1 connected to the drive 28 by the mechanical connection 30 and a third mechanical connection shown as dash line 35. Slave lens 33 is shown to be an elongated strip which may be cut from a normally circular lens shown in phantom by dash line 37. The purpose of the elongated configuration of lens 33 is to produce an elongated exit pupil which will then produce a band of radiation for use by the autofocus detectors as will be better explained hereinafter.

Light from the remote object passes through the slave lens 33 to form an image on a lenslet array 40 having a plurality of tiny lenslets such as 42 formed therein. While only seven lenslets 42 have been shown in FIG. 1, a much larger number (approximately 48) are normally employed. Mounted behind each of the lenslets 42 is a pair of detectors such as shown by lines 45 and 46. As will be more clearly understood by reference to the above mentioned U.S. Pat. No. 4,185,191, the individual detectors such as 45 and 46 each "see" an image of the exit pupil of the lens through which radiation from the object passes, in this case, lens 33. Since lens 33 is in an elongated strip shape, the image thereof will appear as an elongated strip image or band of radiation similar to that produced by the strip mirror of the above mentioned U.S. Pat. No. 4,481,413. This image will be better described in connection with FIG. 3 and is shown in FIG. 1 by vertical line 48 lying across each of the detector pairs such as detectors 45 and 46. The outputs of the detector pairs such as 45 and 46 are presented by a connection shown as arrow 50 to the autofocus circuitry 52 which may be like that shown in the above-referred to U.S. Pat. No. 4,195,191. The output of the autofocus circuitry 52 is shown by an arrow 55 connected to the drive 28 which then operates through the mechanical connections 30, 25 and 35 to position lenses 10 and 33 at the proper focus position for the remote object.

FIG. 2 is substantially the same as FIG. 1, except that instead of a strip shaped lens 33 as was shown in FIG. 1, a regular lens 33' is shown with a mask 60 located in front thereof. mask 60 has a slit aperture 62 therethrough so that light from the remote object passes through the slot 62 to the lens 33' and then onto the lenslet array 40. The slot 62 operates to produce an apparent exit pupil of lens 33 to be an elongated strip so that the detectors such as 45 and 46 will, again, "see" a strip of radiation such as shown by line 48. The remainder of FIG. 2 is the same as FIG. 1 and will not be further described here.

Figure 3:
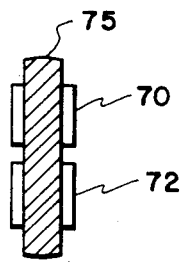
FIG. 3 is an enlarged view of a pair of detectors showing the band of radiation falling thereon.

FIG. 3 shows one pair of detectors identified by reference numerals 70 and 72 spaced a short distance apart and being substantially square although their shape is a matter of design choice. Being of simple shape makes these detectors relatively easy to manufacture and to match. The elongated slit of radiation identified by reference numeral 75 is shown vertically lying across both of the detectors 70 and 72 at approximately the middle thereof. It is, however, not necessary that this be exactly in the middle so long as the band of radiation covers substantially the same area on both of the detectors. This also makes adjustment of the optics much easier as is more completely described in the above-mentioned U.S. Pat. No. 4,481,413.

Figure 4:
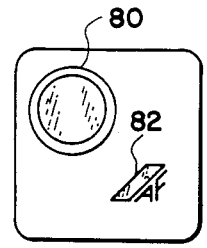
FIG. 4 is a front view of a camera face utilizing the present invention.

In FIG. 4, the front of a video camera is shown having a normal circular taking lens 80 in the upper left-hand portion thereof. The slave lens is shown in FIG. 4 as a diagonal slit 82 in the lower right-hand portion thereof which, is made to attractively cooperate with the letters "AF" that may be inscribed thereon for identifying the camera as an autofocus camera. Lens 82 can, of course, be either a lens formed into the desired elongated shape or may be circular with a slit in the front face of the camera as described in FIG. 1 and 2 above. It will be understood that the slit or strip lens 82 can have all manner of different configurations in order to attractively fit within the necessary area of the camera face.

Figure 5:
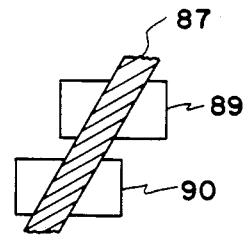
FIG. 5 is an enlarged view of a pair of detectors useful in connection with FIG. 4.

FIG. 5 shows the slit of radiation 87 which might be produced by the exit pupil shape of lens 82 of FIG. 4 falling across a pair of detectors 89 and 90 which in FIG. 5 are at an angle to one another so that the slit of radiation 87 falls across equal areas of both. It should be clear that the slit of radiation need not even be straight lines and that other shapes, for example the figure "S" could be used if desired, so long as the same amount of radiation from different portions of the "S" shape fall across both detectors.

It is thus seen that I have provided a novel and useful autofocus system in which a slave lens is employed and either the lens is shaped in a useful and attractive manner or a mask and slit is employed so as to produce a strip image for the detector pairs and simultaneously provide an attractive camera arrangement. Many obvious modifications will occur to those skilled in the art and I do not wish to be limited to the specific disclosures used in connection with the preferred embodiments. I intend only to be limited by the following claims.

The embodiments of an invention in which an exclusive property or right is claimed are defined as follows:

1. Apparatus for use with an autofocus camera comprising:
   a taking lens;
   motive means for moving the taking lens to a position where the image of a remote object is in proper focus;
   a pair of radiation detectors;
   auxiliary lens means connected to the motive means to be movable with the taking lens; and
   means positioned between the detectors and the auxiliary lens means to produce an image of the exit pupil of the auxiliary lens means on the detectors, the auxiliary lens means being so configured that the image of the exit pupil there of is an elongated band.

2. The apparatus of claim 1 wherein the auxiliary lens means comprises a lens with a mask adjacent thereto, the mask having an elongated aperture therein to configure the exit pupil image into the elongated band.

3. The apparatus of claim 1 wherein the auxiliary lens means comprises a lens formed into an elongated shape to configure the exit pupil image into the elongated band.

4. The apparatus of claim 2 wherein the camera includes a front face and the mask is formed as part of the front face.

5. The apparatus of claim 4 wherein the front face includes a design and the aperture is part of the design.

6. The apparatus of claim 5 wherein the taking lens extends through the front face.

7. The apparatus of claim 3 wherein the camera includes a front face and the auxiliary lens means extends through the front face.

8. The apparatus of claim 7 wherein the front face includes a design and the auxiliary lens means is part of the design.

9. The apparatus of claim 8 wherein the taking lens also extends through the front face.

* * * * *